United States Patent
Hua et al.

(10) Patent No.: US 12,167,435 B2
(45) Date of Patent: Dec. 10, 2024

(54) CONTROL RESOURCE SET SELECTION FOR CHANNEL STATE INFORMATION REFERENCE SIGNAL-BASED RADIO LINK MONITORING

(71) Applicant: Apple Inc., Cupertino, CA (US)

(72) Inventors: Li Hua, Beijing (CN); Yang Tang, San Jose, CA (US); Jie Cui, San Jose, CA (US); Manasa Raghavan, Sunnyvale, CA (US); Zhibin Yu, Unterhaching (DE)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 17/268,198

(22) PCT Filed: Aug. 20, 2019

(86) PCT No.: PCT/US2019/047339
§ 371 (c)(1),
(2) Date: Feb. 12, 2021

(87) PCT Pub. No.: WO2020/041366
PCT Pub. Date: Feb. 27, 2020

(65) Prior Publication Data
US 2021/0185694 A1  Jun. 17, 2021

Related U.S. Application Data

(60) Provisional application No. 62/720,025, filed on Aug. 20, 2018.

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0048* (2013.01); *H04W 24/08* (2013.01); *H04W 72/23* (2023.01)

(58) Field of Classification Search
None
See application file for complete search history.

(56) References Cited

U.S. PATENT DOCUMENTS 11,206,596 B2 * 12/2021 Chen .................. H04W 36/06
2018/0183551 A1   6/2018 Chou et al.
(Continued)

FOREIGN PATENT DOCUMENTS

| WO | 2018/139892 A1 | 8/2018 |
| WO | 2018/142377 A1 | 8/2018 |
| WO | 2018/143776 A1 | 8/2018 |

OTHER PUBLICATIONS

International Search Report dated Dec. 5, 2019 for International Application No. PCT/US2019/047339.
(Continued)

*Primary Examiner* — Christopher T Wyllie
(74) *Attorney, Agent, or Firm* — Eschweiler & Potashnik, LLC

(57) ABSTRACT

A device of a New Radio (NR) User Equipment (UE), a method and a machine readable medium to implement the method. The device includes a Radio Frequency (RF) interface, and processing circuitry coupled to the RF interface, the processing circuitry to: decode a signal from a NR evolved node B (gNodeB) including an indication of one or more control resource sets (CORESETs); select a CORESET based on the indication; and determine a downlink radio link quality based on the CORESET.

9 Claims, 3 Drawing Sheets

(51) Int. Cl.
*H04W 24/08* (2009.01)
*H04W 72/23* (2023.01)

(56) References Cited

U.S. PATENT DOCUMENTS

| | | | | |
|---|---|---|---|---|
| 2018/0219606 A1* | 8/2018 | Ng | .................. | H04L 5/0053 |
| 2018/0234204 A1* | 8/2018 | Nammi | ................ | H04L 1/0003 |
| 2019/0089579 A1* | 3/2019 | Sang | .................. | H04W 40/36 |
| 2019/0215706 A1* | 7/2019 | Tsai | ...................... | H04W 24/04 |
| 2019/0230545 A1* | 7/2019 | Liou | .................... | H04W 24/10 |
| 2019/0260484 A1* | 8/2019 | Nam | ................... | H04B 17/309 |
| 2019/0261244 A1* | 8/2019 | Jung | .................... | H04W 36/06 |
| 2019/0313411 A1* | 10/2019 | Ly | ..................... | H04W 72/0453 |
| 2019/0320333 A1* | 10/2019 | Koskela | .............. | H04B 7/0617 |
| 2019/0349059 A1* | 11/2019 | John Wilson | ......... | H04L 5/0091 |
| 2019/0393980 A1* | 12/2019 | Lin | ..................... | H04L 27/2607 |
| 2020/0205134 A1* | 6/2020 | Pan | ....................... | H04W 72/12 |
| 2020/0221428 A1* | 7/2020 | Moon | .................... | H04B 7/024 |
| 2020/0275419 A1* | 8/2020 | Wang | ................ | H04W 72/0446 |
| 2020/0344019 A1* | 10/2020 | Da Silva | ............... | H04W 24/10 |
| 2020/0358582 A1* | 11/2020 | Takeda | ................. | H04B 7/0695 |
| 2020/0366398 A1* | 11/2020 | Takeda | ................. | H04J 11/0069 |
| 2020/0389884 A1* | 12/2020 | Hakola | ............... | H04W 36/362 |
| 2020/0403683 A1* | 12/2020 | Davydov | ................ | H04L 67/10 |
| 2021/0050936 A1* | 2/2021 | Seo | ........................ | H04W 72/20 |
| 2021/0185694 A1* | 6/2021 | Hua | ...................... | H04W 48/16 |
| 2021/0250074 A1* | 8/2021 | Hosseini | ............... | H04L 1/0036 |

OTHER PUBLICATIONS

Mediatek Inc.; 3GPP TSG-RAN WG4 Meeting #88; "CR on TS38.133 for RLM requirements"; R4-1810244; Aug. 20, 2018.
ZTE; "Remaining issues on CSI-RS based RLM" 3GPP TSG-RAN WG4 Meeting #88; R4-1810745; Aug. 20, 2018.
EP Supplemental Search Report dated Feb. 4, 2022 in connection with Application No. EP19852775.6.
3GPP TS 38.300 V15.2.0; 3rd Generation Partnership Project; Technical Specification Group Radio Access Network; NR; NR and NG-RAN Overall Description; Stage 2; (Release 15) Jun. 2018; p. 2-87.

* cited by examiner

CONTROL RESOURCE SET SELECTION FOR CHANNEL STATE INFORMATION REFERENCE SIGNAL-BASED RADIO LINK MONITORING

CROSS REFERENCE TO RELATED APPLICATION

This application is a National Phase entry application of International Patent Application No. PCT/US2019/047339 filed Aug. 20, 2019, which claims priority to U.S. Provisional Application No. 62/720,025 entitled "CORESET SELECTION FOR CSI-RS BASED RLM" filed Aug. 20, 2018, and is hereby incorporated by reference in its entirety.

FIELD

Various embodiments generally may relate to the field of wireless communications, and particularly to Control Resource Set (CORESET) selection.

BACKGROUND

In the third generation partnership project (3GPP) (NR) specification, in some scenarios, it may be possible that a configured channel state information reference signal (CSI-RS) is quasi co-located (QCL'ed) with multiple CORESETs. Each CORESET has a set of parameters of which the subcarrier spacing (SCS), number of orthogonal frequency division multiplexing (OFDM) symbols, bandwidth and cyclic prefix (CP) length will be used to determine hypothetical physical downlink control channel (PDCCH) block error rate (BLER). To avoid ambiguity, the rule(s) on how to determine CORESET should be clarified.

DETAILED DESCRIPTION

Figure 1:
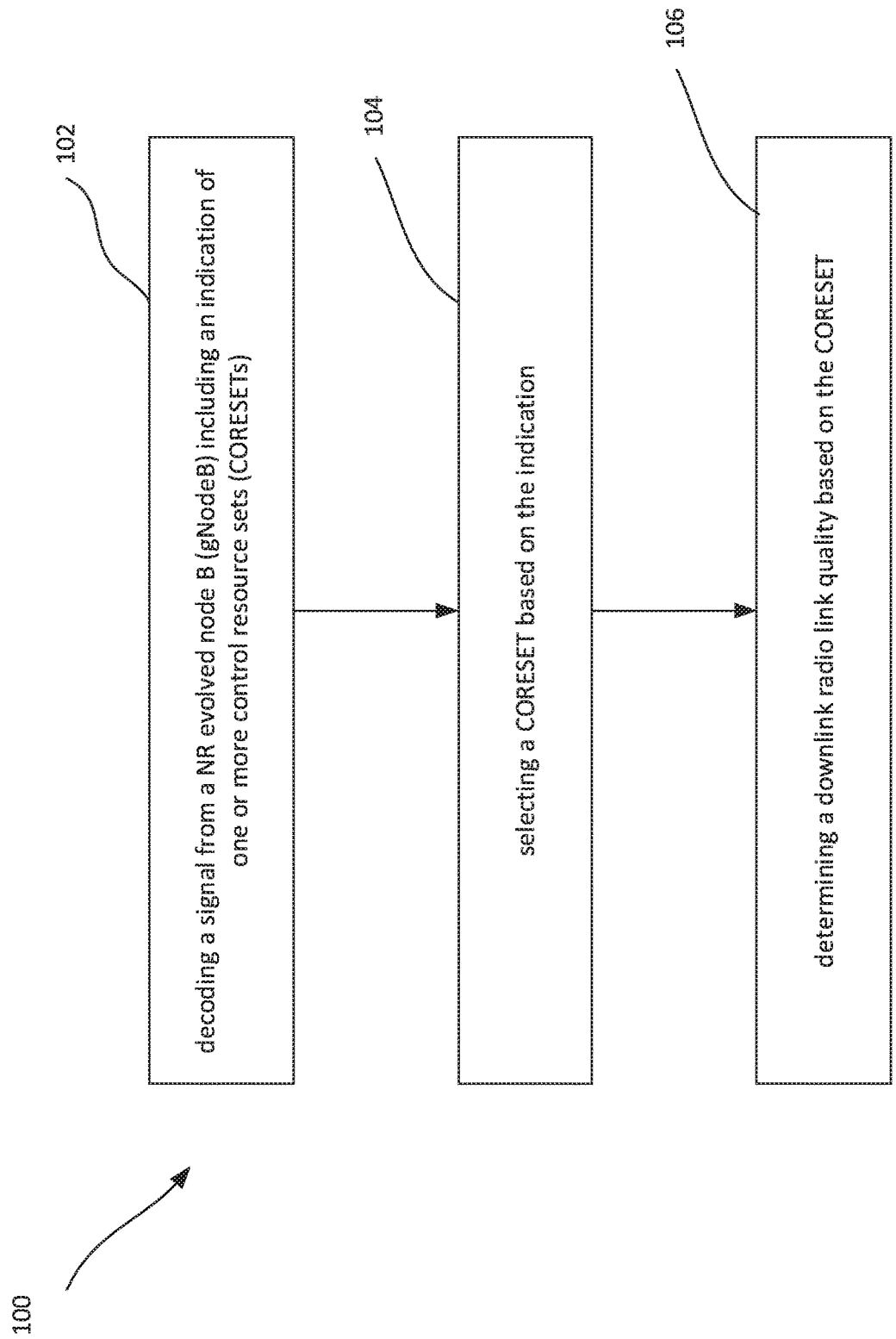
FIG. 1 illustrates a process to be performed by a device, such as a baseband processing circuitry, of a UE, according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

One or more embodiments described herein are related to one or more third generation partnership project (3GPP) specifications. Examples of these specifications include, but are not limited to, one or more 3GPP New Radio (NR) specifications and one or more specifications directed and/or related to RAN1 and/or fifth generation (5G) mobile networks/systems.

As previously noted, in some scenarios, it may be possible that a configured channel state information reference signal (CSI-RS) is quasi co-located (QCLed) with multiple CORESETs. Each CORESET has a set of parameters of which the subcarrier spacing (SCS), number of orthogonal frequency division multiplexing (OFDM) symbols, bandwidth and cyclic prefix (CP) length will be used to determine a hypothetical physical downlink control channel (PDCCH) block error rate (BLER). To avoid ambiguity, the rule(s) on how to determine CORESET should be clarified.

Embodiments herein provide mechanisms to select one or more CORESETs when CSI-RS is QCLed with multiple CORESETs.

As mentioned previously, it could be possible that a configured CSI-RS is QCLed with multiple CORESETs. Additionally, a New Radio (NR) evolved Node B (gNodeB/gNodeB) can configure more than one CORESET for a user equipment (UE). Meanwhile, one CSI-RS based radio link monitoring-reference signal (RLM-RS) may be QCLed with one synchronization signal block (SSB), and the SSB may be QCLed with another CORESET. Therefore, the latter CSI-RS can be QCLed to multiple CORESETs.

Each CORESET has a set of parameters of which the SCS, number of OFDM symbols, bandwidth and CP length will be used to determine the hypothetical PDCCH BLER. These parameters of the multiple CORSETs may be the same or totally different. The parameters of each CORESET would determine a hypothetical PDCCH BLER. For each CORESET, the threshold to declare out-of-sync (OOS) for the RLM will be different. To avoid ambiguity, embodiments herein provide mechanisms for determining CORESET.

In a first embodiments, the gNode B may sends an indication to the UE to tell the UE which CORESET will be (or should be) chosen. In this embodiment, the UE will calculate the hypothetical PDCCH BLER, and the OOS indication is triggered when the BLER is higher than an OOS threshold.

In a second embodiments, the UE randomly chooses one CORESET if there are multiple candidate CORESETs from which to choose. In this embodiment, the UE will calculate the hypothetical PDCCH BLER, and the OOS indication is triggered when the BLER is higher than the OOS threshold.

In a third embodiments, the UE checks all the CORESETs, and the OOS indication is triggered only if all the BLERs from all CORESETs are higher than the OOS threshold.

Radio Link Monitoring (RLM) Aspects

Section 5 of TS 38.213 V15.2.0 (Section 5), "Radio Link Monitoring (RLM)" refers to mechanisms used by the UE for monitoring the downlink (DL) radio link quality of a primary cell for the purpose of indicating out-of-sync/in-sync status to higher layers. The UE is not required to monitor the downlink radio link quality in DL bandwidth parts (BWPs) other than the active DL BWP on the primary cell.

According to Section 5, if the UE is configured with a secondary cell group (SCG), and the parameter rlf-TimersAndConstants is provided by the higher layers and is not set to release, the downlink radio link quality of the primary secondary cell (PSCell) of the SCG is monitored by the UE for the purpose of indicating out-of-sync/in-sync status to higher layers. The UE is not required to monitor the downlink radio link quality in DL BWPs other than the active DL BWP.

According to Section 5, the UE can be configured for each DL BWP of an SpCell with a set of resource indexes, through a corresponding set of higher layer parameters RadioLinkMonitoringRS, for radio link monitoring by higher layer parameter failureDetectionResources. The UE is provided by higher layer parameter RadioLinkMonitoringRS, with either a CSI-RS resource configuration index (by higher layer parameter csi-RS-Index), or a synchronization signal (SS) physical broadcast channel (PBCH) (SS/PBCH) block index (by higher layer parameterssb-Index). The UE can be configured with up to a number $N_{LR-RM}$ RadioLinkMonitoringRS for link recovery (LR) procedures, as discussed below, and radio link monitoring. From the $N_{LR-RM}$ RadioLinkMonitoringRS, up to a number $N_{RLM}$ RadioLinkMonitoringRS can be used for radio link monitoring depending on a maximum number L of candidate SS/PBCH blocks per half frame, and up to two RadioLinkMonitoringRS can be used for link recovery procedures.

According to Section 5, if the UE is not provided higher layer parameter RadioLinkMonitoringRS and the UE is provided by higher layer parameter TCI-state for PDCCH (with TCI referring to transmission configuration indication), one or more reference signals (RSs) that include one or more of a CSI-RS and/or a SS/PBCH block:
  the UE uses for radio link monitoring the RS provided for the active TCI state for PDCCH if the active TCI state for PDCCH includes only one RS;
  if the active TCI state for PDCCH includes two RSs, the UE expects that one RS has QCL-TypeD and the UE uses the one RS for radio link monitoring; the UE does not expect both RS to have QCL-TypeD
  the UE is not required to use for radio link monitoring an aperiodic RS According to Section 5, the UE is not expected to use more than $N_{RLM}$ RadioLinkMonitoringRS for radio link monitoring when the UE is not provided higher layer parameter RadioLinkMonitoringRS.

Values of $N_{LR-RM}$ and $N_{RLM}$ for different values of L are given in Table 5-1 of TS 38.213 V15.2.0.

According to Section 5, for a CSI-RS resource configuration, the higher layer parameter powerControlOffsetSS is not applicable and a UE expects to be provided only 'No CDM' from higher layer parameter cdm-Type, only '1' and '3' from higher layer parameter density, and only '1 port' from higher layer parameter nrofPorts, with CDM referring to code division multiplexing.

According to Section 5, in non-discontinuous reception (non-DRX) mode operation, the physical layer in the UE assesses once per indication period the radio link quality, evaluated over the previous time period against thresholds ($Q_{out}$ and $Q_{in}$) configured by higher layer parameter rlmInSyncOutOfSyncThreshold. The UE determines the indication period as the maximum between the shortest periodicity for radio link monitoring resources and 10 msec.

According to Section 5, in DRX mode operation, the physical layer in the UE assesses once per indication period the radio link quality, evaluated over the previous time period, against thresholds ($Q_{out}$ and $Q_{in}$) provided by higher layer parameter rlmInSyncOutOfSyncThreshold. The UE determines the indication period as the maximum between the shortest periodicity for radio link monitoring resources and the DRX period.

According to Section 5, the physical layer in the UE indicates, in frames where the radio link quality is assessed, out-of-sync to higher layers when the radio link quality is worse than the threshold $Q_{out}$ for all resources in the set of resources for radio link monitoring. When the radio link quality is better than the threshold $Q_{in}$ for any resource in the set of resources for radio link monitoring, the physical layer in the UE indicates, in frames where the radio link quality is assessed, in-sync to higher layers.

According to an embodiment, a device of the UE, such as a baseband processor or other circuitry, is to decode a signal from a NR evolved node B (gNodeB) including an indication of one or more control resource sets (CORESETs), to select a CORESET based on the indication and to determine a downlink radio link quality based on the CORESET.

Figure 2:
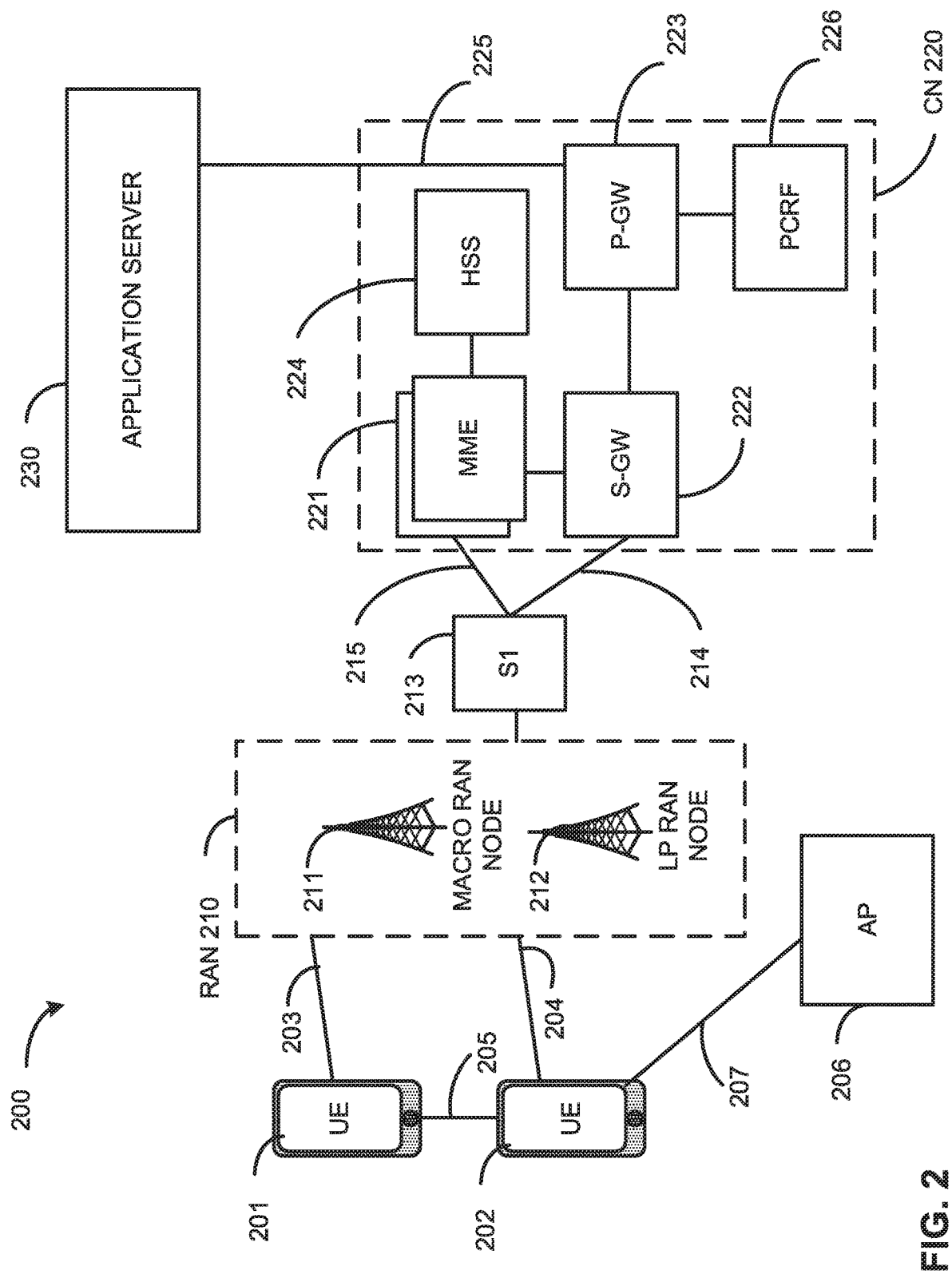
FIG. 2 illustrates an architecture of a system of a network according to some embodiments.

Referring to FIG. 2, a process 100 is shown for a method embodiment as described above. Operation 102 includes decoding a signal from a NR evolved node B (gNodeB) including an indication of one or more control resource sets (CORESETs). Operation 104 includes selecting a CORESET based on the indication. Operation 106 includes determining a downlink radio link quality based on the CORESET.

According to one embodiment, the UE is to monitor the downlink link quality based on the reference signal in the configured RLM-RS resource(s) in order to detect the downlink radio link quality of the PCell and PSCell. The configured RLM-RS resources can be all SSBs, or all CSI-RSs, or a mix of SSBs and CSI-RSs. The UE is not required to perform RLM outside the active DL BWP. The reference signal for RLM is a resource out of the set of resources configured for RLM by higher layer parameter RLM-RS-List.

According to an embodiment, on each RLM-RS resource, the UE is to estimate the downlink radio link quality and compare it to the thresholds $Q_{out}$ and $Q_{in}$ for the purpose of monitoring downlink radio link quality of the cell. The threshold $Q_{out}$ is defined as the level at which the downlink radio link cannot be reliably received and is to correspond to the out-of-sync block error rate ($BLER_{out}$) as defined in Table RLM.1-1 below. For SSB based radio link monitoring, $Q_{out\_SSB}$ is derived based on the hypothetical PDCCH transmission parameters listed in Table RLM.2-1 below. For CSI-RS based radio link monitoring, $Q_{out\_CSI-RS}$ is derived based on the hypothetical PDCCH transmission parameters listed in Table RLM.3-1 below.

The threshold $Q_{in}$ is defined as the level at which the downlink radio link quality can be significantly more reliably received than at $Q_{out}$ and is to correspond to the in-sync block error rate ($BLER_{in}$) as defined in Table RLM.1-1. For SSB based radio link monitoring, $Q_{in\_SSB}$ is derived based on the hypothetical PDCCH transmission parameters listed in Table RLM.2-2. For CSI-RS based radio link monitoring, $Q_{in\_CSI-RS}$ is derived based on the hypothetical PDCCH transmission parameters listed in Table RLM.3-2.

According to an embodiment, the out-of-sync block error rate ($BLER_{out}$) and in-sync block error rate ($BLER_{in}$) are determined from the network configuration via parameter RLM-IS-OOS-thresholdConfig signaled by higher layers. The network can configure one of the two pairs of out-of-sync and in-sync block error rates which are shown in Table RLM.1-1 below. When the UE is not configured with RLM-IS-OOS-thresholdConfig from the network, the UE determines out-of-sync and in-sync block error rates from Configuration #0 in Table RLM.1-1 as a default.

TABLE RLM.1-1

| Out-of-sync and in-sync block error rates | | |
|---|---|---|
| Configuration | $BLER_{out}$ | $BLER_{in}$ |
| 0 | 10% | 2% |
| 1 | TBD | TBD |

According to an embodiment, the UE is to be able to monitor up to a value $X_{RLM-RS}$ RLM-RS resources of the same or different types in each corresponding carrier frequency range, where $X_{RLM-RS}$ is specified in Table RLM.1-2, and meets the requirements as specified below.

TABLE RLM.1-2

Maximum number of RLM-RS resources $X_{RLM-RS}$

| Maximum number of RLM-RS resources, $X_{RLM-RS}$ | Carrier frequency range of PCell/PSCell |
|---|---|
| 2 | FR1, ≤ 3 GHz |
| 4 | FR1, > 3 GHz |
| 8 | FR2 |

Requirements for SSB Based Radio Link Monitoring

According to one embodiment, each SSB based RLM-RS resource is configured for a PCell and/or a PSCell provided that the SSBs configured for RLM are actually transmitted within UE active DL BWP during an entire evaluation period as explained further below in the context of Tables RLM.2-3 and RLM.2-4.

TABLE RLM.2-1

PDCCH transmission parameters for out-of-sync

| Attribute | Value for BLER pair#0 | Value for BLER pair#1 |
|---|---|---|
| DCI format | 1-0 | TBD |
| Number of control OFDM symbols | Same as the number of symbols of RMSI CORESET | |
| Aggregation level (CCE) | 8 | |
| Ratio of hypothetical PDCCH RE energy to average SSS RE energy | 4 dB | |
| Ratio of hypothetical PDCCH DMRS energy to average SSS RE energy | 4 dB | |
| Bandwidth (MHz) | Same as the number of PRBs of RMSI CORESET | |
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

TABLE RLM.2-2

PDCCH transmission parameters for in-sync

| Attribute | Value for BLER pair#0 | Value for BLER pair#1 |
|---|---|---|
| DCI payload size | 1-0 | TBD |
| Number of control OFDM symbols | Same as the number of symbols of RMSI CORESET | |
| Aggregation level (CCE) | 4 | |
| Ratio of hypothetical PDCCH RE energy to average SSS RE energy | 0 dB | |

TABLE RLM.2-2-continued

PDCCH transmission parameters for in-sync

| Attribute | Value for BLER pair#0 | Value for BLER pair#1 |
|---|---|---|
| Ratio of hypothetical PDCCH DMRS energy to average SSS RE energy | 0 dB | |
| Bandwidth (MHz) | Same as the number of PRBs of RMSI CORESET | |
| Sub-carrier spacing (kHz) | Same as the SCS of RMSI CORESET | |
| DMRS precoder granularity | REG bundle size | |
| REG bundle size | 6 | |
| CP length | Same as the CP length of RMSI CORESET | |
| Mapping from REG to CCE | Distributed | |

Minimum Requirements

According to an embodiment, the UE is to be able to evaluate whether the downlink radio link quality on the configured RLM-RS resource estimated over the last $T_{Evaluate\_out\_SSB}$ [ms] period becomes worse than the threshold $Q_{out\_SSB}$ within $T_{Evaluate\_out\_SSB}$ [ms] evaluation period.

UE is to be able to evaluate whether the downlink radio link quality on the configured RLM-RS resource estimated over the last $T_{Evaluate\_in\_SSB}$ [ms] period becomes better than the threshold $Q_{in\_SSB}$ within $T_{Evaluate\_in\_SSB}$ [ms] evaluation period.

$T_{Evaluate\_out\_SSB}$ and $T_{Evaluate\_in\_SSB}$ are defined in Table RLM.2-3 herein for FR1 (corresponding to a frequency range from 410 MHz-7125 MHz).

$T_{Evaluate\_out\_SSB}$ and $T_{Evaluate\_in\_SSB}$ are defined in Table RLM.2-4 herein for FR2 with N=1, if the SSB configured for RLM is spatially QCLed and TDMed (time division multiplexed) to CSI-RS resources configured for BM, and the QCL association is known to UE;

N=FFS, otherwise.

For FR1, $P=1/(1-T_{SSB}/MGRP)$, when in the monitored cell there are measurement gaps configured for intra-frequency, inter-frequency or inter-RAT measurements, which are overlapping with some but not all occasions of the SSB; and P=1 when in the monitored cell there are no measurement gaps overlapping with any occasion of the SSB.

For FR2, $P=1/(1-T_{SSB}/T_{SMTCperiod})$, when RLM-RS is not overlapped with measurement gap and RLM-RS is partially overlapped with SMTC occasion ($T_{SSB}<S_{SMTCperiod}$).

P is $P_{sharing\ factor}$, when RLM-RS is not overlapped with measurement gap and RLM-RS is fully overlapped with SMTC period ($T_{SSB}=T_{SMTCperiod}$).

P is $1/(1-T_{SSB}/MGRP-T_{SSB}/T_{SMTCperiod})$, when RLM-RS is partially overlapped with measurement gap and RLM-RS is partially overlapped with SMTC occasion ($T_{SSB}<T_{SMTCperiod}$) and SMTC occasion is not overlapped with measurement gap, and $T_{SMTCperiod} \neq MGRP$ or $T_{SMTCperiod}=MGRP$ and $T_{SSB}<0.5*T_{SMTCperiod}$ P is $1/(1-T_{SSB}/MGRP)*P_{sharing\ factor}$, when RLM-RS is partially overlapped with measurement gap and RLM-RS is partially overlapped with SMTC occasion ($T_{SSB}<T_{SMTCperiod}$) and SMTC occasion is not overlapped with measurement gap and $T_{SMTCperiod}$=MGRP and $T_{SSB}$=0.5*$T_{SMTCperiod}$ P is 1/{1−$T_{SSB}$/min ($T_{SMTCperiod}$,MGRP)}, when RLM-RS is partially overlapped with measurement gap and RLM-RS is partially overlapped with SMTC occasion ($T_{SSB}<T_{SMTCperiod}$) and SMTC occasion is partially overlapped with measurement gap ($T_{SMTCperiod}$<MGRP)

P is 1/(1−$T_{SSB}$/MGRP)*$P_{sharing\_factor}$, when RLM-RS is partially overlapped with measurement gap and RLM-RS is fully overlapped with SMTC occasion ($T_{SSB}=T_{SMTCperiod}$) and SMTC occasion is partially overlapped with measurement gap ($T_{SMTCperiod}$<MGRP)

$P_{sharing\_factor}$ is FFS

According to an embodiment, a longer evaluation period may be expected if the combination of RLM-RS, SMTC occasion and measurement gap configurations does not meet pervious conditions.

TABLE RLM.2-3

Evaluation period $T_{Evaluate\_out}$ and $T_{Evaluate\_in}$ for FR1

| Configuration | $T_{Evaluate\_out}$ (ms) | $T_{Evaluate\_in}$ (ms) |
|---|---|---|
| non-DRX | max(200, ceil(10*P)*$T_{SSB}$) | max(100, ceil(5*P)*$T_{SSB}$) |
| DRX cycle ≤ 320 | max(200, ceil(15*P)*max($T_{DRX}$, $T_{SSB}$)) | max(100, ceil(7.5*P)*max($T_{DRX}$, $T_{SSB}$)) |
| DRX cycle > 320 | ceil(10*P)*$T_{DRX}$ | ceil(5*P)*$T_{DRX}$ |

NOTE:
$T_{SSB}$ is the periodicity of SSB configured for RLM.
$T_{DRX}$ is the DRX cycle length.

TABLE RLM.2-4

Evaluation period $T_{Evaluate\_out}$ and $T_{Evaluate\_in}$ for FR2

| Configuration | $T_{Evaluate\_out}$ (ms) | $T_{Evaluate\_in}$ (ms) |
|---|---|---|
| non-DRX | max(200, ceil(10*P*N)*$T_{SSB}$) | max(100, ceil(5*P*N)*$T_{SSB}$) |
| DRX cycle ≤ 320 | max(200, ceil(15*P*N)*max($T_{DRX}$, $T_{SSB}$)) | max(100, ceil(7.5*P*N)*max($T_{DRX}$, $T_{SSB}$)) |
| DRX cycle > 320 | ceil(10*P*N)*$T_{DRX}$ | ceil(5*P*N)*$T_{DRX}$ |

NOTE:
$T_{SSB}$ is the periodicity of SSB configured for RLM.
$T_{DRX}$ is the DRX cycle length.

Requirements for CSI-RS Based Radio Link Monitoring

According to one embodiment, each CSI-RS based RLM-RS resource may be configured for a PCell and/or a PSCell provided that the CSI-RSs configured for RLM are actually transmitted within UE active DL BWP during the entire evaluation period specified below.

TABLE RLM.3-1

PDCCH transmission parameters for out-of-sync

| Attribute | Value for BLER pair#0 | Value for BLER pair#1 |
|---|---|---|
| DCI format | 1-0 | TBD |
| Number of control OFDM symbols | Same as the number of symbols of CORESET QCLed with respective CSI-RS for RLM | |

TABLE RLM.3-1-continued

PDCCH transmission parameters for out-of-sync

| Attribute | Value for BLER pair#0 | Value for BLER pair#1 |
|---|---|---|
| Aggregation level (CCE) | [8] | |
| Ratio of hypothetical PDCCH RE energy to average CSI-RS RE energy | [4] dB | |
| Ratio of hypothetical PDCCH DMRS energy to average CSI-RS RE energy | [4] dB | |
| Bandwidth (MHz) | Same as the number of PRBs of CORESET QCLed with respective CSI-RS for RLM | |

TABLE RLM.3-1-continued

PDCCH transmission parameters for out-of-sync

| Attribute | Value for BLER pair#0 | Value for BLER pair#1 |
|---|---|---|
| Sub-carrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

TABLE RLM.3-2

PDCCH transmission parameters for in-sync

| Attribute | Value for BLER pair#0 | Value for BLER pair#1 |
|---|---|---|
| DCI payload size | [1-0] | TBD |
| Number of control OFDM symbols | Same as the number of symbols of CORESET QCLed with respective CSI-RS for RLM | |
| Aggregation level (CCE) | [4] | |
| Ratio of hypothetical PDCCH RE energy to average CSI-RS RE energy | [0] dB | |
| Ratio of hypothetical PDCCH DMRS energy to average CSI-RS RE energy | [0] dB | |
| Bandwidth (MHz) | Same as the number of PRBs of CORESET QCLed with respective CSI-RS for RLM | |
| Sub-carrier spacing (kHz) | Same as the SCS of CORESET QCLed with respective CSI-RS for RLM | |
| DMRS precoder granularity | REG bundle size | |
| REG bundle size | 6 | |
| CP length | Same as the CP length of CORESET QCLed with respective CSI-RS for RLM | |
| Mapping from REG to CCE | Distributed | |

Minimum Requirements

According to an embodiment, the UE is to be able to evaluate whether the downlink radio link quality on the configured RLM-RS resource estimated over the last $T_{Evaluate\_out\_CSI-RS}$ [ms] period becomes worse than the threshold $Q_{out\_CSI-RS}$ within $T_{Evaluate\_out\_CSI-RS}$ [ms] evaluation period.

UE is to be able to evaluate whether the downlink radio link quality on the configured RLM-RS resource estimated over the last $T_{Evaluate\_in\_CSI-RS}$ [ms] period becomes better than the threshold $Q_{in\_CSI-RS}$ within $T_{Evaluate\_in\_CSI-RS}$ [ms] evaluation period.

$T_{Evaluate\_out\_CSI-RS}$ and $T_{Evaluate\_in\_CSI-RS}$ are defined in Table RLM.3-3 for FR1.

$T_{Evaluate\_out\_CSI-RS}$ and $T_{Evaluate\_in\_CSI-RS}$ are defined in Table RLM.3-4 for FR2, where N=1, if the CSI-RS resource configured for RLM is spatially QCLed and TDMed to CSI-RS resources configured for BM or SSBs configured for BM, and the QCL association is known to UE;

N=FFS, otherwise.

For FR1, $P=1/(1-T_{CSI-RS}/MGRP)$, when in the monitored cell there are measurement gaps configured for intra-frequency, inter-frequency or inter-RAT measurements, which are overlapping with some but not all occasions of the CSI-RS; and $P=1$ when in the monitored cell there are no measurement gaps overlapping with any occasion of the CSI-RS.

For FR2, $P=1$, when RLM-RS is not overlapped with measurement gap and also not overlapped with SMTC occasion.

$P=1/(1-T_{CSI-RS}/MGRP)$, when RLM-RS is partially overlapped with measurement gap and RLM-RS is not overlapped with SMTC occasion ($T_{CSI-RS}$<MGRP)

$P=1/(1-T_{CSI-RS}/T_{SMTCperiod})$, when RLM-RS is not overlapped with measurement gap and RLM-RS is partially overlapped with SMTC occasion ($T_{CSI-RS}$<$T_{SMTCperiod}$).

P is $P_{sharing\ factor}$, when RLM-RS is not overlapped with measurement gap and RLM-RS is fully overlapped with SMTC occasion ($T_{CSI-RS}$=$T_{SMTCperiod}$).

P is $1/(1-T_{CSI-RS}/MGRP-T_{CSI-RS}/T_{SMTCperiod})$, when RLM-RS is partially overlapped with measurement gap and RLM-RS is partially overlapped with SMTC occasion (TCSI-RS<$T_{SMTCperiod}$) and SMTC occasion is not overlapped with measurement gap and $T_{SMTCperiod}$≠MGRP or $T_{SMTCperiod}$=MGRP and $T_{CSI-RS}$<0.5*$T_{SMTCperiod}$ P is $1/(1-T_{CSI-RS}/MGRP)*P_{sharing\ factor}$, when RLM-RS is partially overlapped with measurement gap and RLM-RS is partially overlapped with SMTC occasion ($T_{CSI-RS}$<$T_{SMTCperiod}$) and SMTC occasion is not overlapped with measurement gap and $T_{SMTCperiod}$=MGRP and $T_{CSI-RS}$=0.5*$T_{SMTCperiod}$ P is $1/\{1-T_{CSI-RS}/min(T_{SMTCperiod},MGRP)\}$, when RLM-RS is partially overlapped with measurement gap and RLM-RS is partially overlapped with SMTC occasion ($T_{CSI-RS}$<$T_{SMTCperiod}$) and SMTC occasion is partially overlapped with measurement gap ($T_{SMTCperiod}$<MGRP)

P is $1/(1-T_{CSI-RS}/MGRP)*P_{sharing\ factor}$, when RLM-RS is partially overlapped with measurement gap and RLM-RS is fully overlapped with SMTC occasion ($T_{CSI-RS}$=$T_{SMTCperiod}$) and SMTC occasion is partially overlapped with measurement gap ($T_{SMTCperiod}$<MGRP)

$P_{sharing\ factor}$ is FFS

According to an embodiment, longer evaluation period would be expected if the combination of RLM-RS, SS/PBCH Block Measurement Time Configuration (SMTC) occasion and measurement gap configurations does not meet pervious conditions.

The values of $M_{out}$ and $M_{in}$ used in Table RLM.3-3 and Table RLM.3-4 are defined as:

$M_{out}$=20 and $M_{in}$=10, if the CSI-RS resource configured for RLM is transmitted with Density=3.

TABLE RLM.3-3

Evaluation period $T_{Evaluate\_out}$ and $T_{Evaluate\_in}$ for FR1

| Configuration | $T_{Evaluate\_out}$ (ms) | $T_{Evaluate\_in}$ (ms) |
|---|---|---|
| non-DRX | max(200, ceil($M_{out}$ × P) × $T_{CSI-RS}$) | max(100, ceil($M_{in}$ × P) × $T_{CSI-RS}$) |
| DRX ≤ 320 ms | max(200, ceil(1.5 × $M_{out}$ × P) × max($T_{DRX}$, $T_{CSI-RS}$)) | max(100, ceil(1.5 × $M_{in}$ × P) × max($T_{DRX}$, $T_{CSI-RS}$)) |
| DRX > 320 ms | ceil($M_{out}$ × P) × $T_{DRX}$ | ceil($M_{in}$ × P) × $T_{DRX}$ |

$T_{CSI-RS}$ is the periodicity of CSI-RS resource configured for RLM.
$T_{DRX}$ is the DRX cycle length.

TABLE RLM.3-4

Evaluation period $T_{Evaluate\_out}$ and $T_{Evaluate\_in}$ for FR2

| Configuration | $T_{Evaluate\_out}$ (ms) | $T_{Evaluate\_in}$ (ms) |
|---|---|---|
| non-DRX | max(200, ceil($M_{out}$ × P × N) × $T_{CSI-RS}$) | max(100, ceil($M_{in}$ × P × N) × $T_{CSI-RS}$) |
| DRX ≤ 320 ms | max(200, ceil(1.5 × $M_{out}$ × P × N) × max($T_{DRX}$, $T_{CSI-RS}$)) | max(100, ceil(1.5 × Min × P × N) × max($T_{DRX}$, $T_{CSI-RS}$)) |
| DRX > 320 ms | ceil($M_{out}$ × P × N) × $T_{DRX}$ | ceil($M_{in}$ × P × N) × $T_{DRX}$ |

$T_{CSI-RS}$ is the periodicity of CSI-RS resource configured for RLM.
$T_{DRX}$ is the DRX cycle length.

$T_{CSI-RS}$ refers to the sub-frame configuration cycle, and is a cell specific parameter configured by the higher layer signaling, and is used along with other parameters to define the CSI-RS. $T_{DRX}$ refers to the discontinuous reception cycle.

Minimum Requirement for L1 Indication

According to an embodiment, when the downlink radio link quality on all the configured RLM-RS resources is worse than $Q_{out}$, Layer 1 of the UE is to send an out-of-sync indication for the cell to the higher layers. A Layer 3 filter is to be applied to the out-of-sync indications.

According to an embodiment, when the downlink radio link quality on at least one of the configured RLM-RS resources is better than $Q_{in}$, Layer 1 of the UE is to send an in-sync indication for the cell to the higher layers. A Layer 3 filter is to be applied to the in-sync indications.

According to an embodiment, the out-of-sync and in-sync evaluations for the configured RLM-RS resources is to be performed. Two successive indications from Layer 1 is to be separated by at least $T_{indication\_interval}$.

According to an embodiment, when DRX is not used $T_{indication\_interval}$ is max(10 ms, $T_{RLM-RS,M}$), where $T_{RLM,M}$ is the shortest periodicity of all configured RLM-RS resources for the monitored cell, which corresponds to $T_{SSB}$ if the RLM-RS resource is SSB, or $T_{CSI-RS}$ if the RLM-RS resource is CSI-RS.

According to an embodiment, in case DRX is used, upon start of T310 timer, the UE is to monitor the configured RLM-RS resources for recovery using the evaluation period and Layer 1 indication interval corresponding to the non-DRX mode until the expiry or stop of T310 timer.

Scheduling Availability of UE During Radio Link Monitoring

According to an embodiment, when the reference signal to be measured for RLM has different subcarrier spacing than PDSCH/PDCCH and on frequency range FR2, there may be restrictions on the scheduling availability as described below.

Scheduling Availability of UE Performing Radio Link Monitoring with a Same Subcarrier Spacing as PDSCH/PDCCH on FR1

There are no scheduling restrictions due to radio link monitoring performed with a same subcarrier spacing as PDSCH/PDCCH on FR1.

Scheduling Availability of UE Performing Radio Link Monitoring with a Different Subcarrier Spacing than PDSCH/PDCCH on FR1

According to an embodiment, for a UE which support simultaneousRxDataSSB-DiffNumerology [14] there are no restrictions on scheduling availability due to radio link monitoring based on SSB as RLM-RS. For a UE which does not support simultaneousRxDataSSB-DiffNumerology [14] the following restrictions may apply due to radio link monitoring based on SSB as RLM-RS. The UE is not expected to transmit PUCCH/PUSCH or receive PDCCH/PDSCH on SSB symbols to be measured for radio link monitoring. When intra-band carrier aggregation is performed, the scheduling restrictions apply to all serving cells on the band due to radio link monitoring performed on FR1 serving PCell or PSCell in the same band. When inter-band carrier aggregation within FR1 is performed, there are no scheduling restrictions on FR1 serving cell(s) in the bands due to radio link monitoring performed on FR1 serving PCell or PSCell in different bands.

Scheduling Availability of UE Performing Radio Link Monitoring on FR2

According to an embodiment, the following scheduling restriction applies due to radio link monitoring on an FR2 serving PCell and/or PSCell.

The UE is not expected to transmit PUCCH/PUSCH or receive PDCCH/PDSCH on RLM-RS symbols to be measured for radio link monitoring, except for RMSI PDCCH/PDSCH and PDCCH/PDSCH which is not required to be received by RRC_CONNECTED mode UE.

Scheduling Availability of UE Performing Radio Link Monitoring on FR1 or FR2 in Case of FR1-FR2 Inter-Band CA There are no scheduling restrictions on FR1 serving cell(s) due to radio link monitoring performed on FR2 serving PCell and/or PSCell.

There are no scheduling restrictions on FR2 serving cell(s) due to radio link monitoring performed on FR1 serving PCell and/or PSCell.

Link Recovery Procedures

According to Section 5, A UE can be provided, for a serving cell, with a set $\bar{q}_0$ of periodic CSI-RS resource configuration indexes by higher layer parameter failureDetectionResources and with a set $\bar{q}_1$ of periodic CSI-RS resource configuration indexes and/or SS/PBCH block indexes by higher layer parameter candidateBeamRSList for radio link quality measurements on the serving cell. If the UE is not provided with higher layer parameter failureDetectionResources, the UE determines the set $\bar{q}_0$ to include SS/PBCH block indexes and periodic CSI-RS resource configuration indexes with same values as the RS indexes in the RS sets indicated by the TCI states for respective control resource sets that the UE uses for monitoring PDCCH. The UE expects the set $\bar{q}_0$ to include up to two RS indexes and, if there are two RS indexes, the set $\bar{q}_0$ includes only RS indexes with QCL-TypeD configuration for the corresponding TCI states. The UE expects single port RS in the set $\bar{q}_0$.

According to Section 5, the threshold $Q_{out,LR}$ corresponds to the default value of higher layer parameter rlmInSyncOutOfSyncThreshold and to the value provided by higher layer parameter rsrp-ThresholdSSB, respectively.

According to Section 5, the physical layer in the UE assesses the radio link quality according to the set $\bar{q}_0$ of resource configurations against the threshold $Q_{out,LR}$. For the set $\bar{q}_0$, the UE assesses the radio link quality only according to periodic CSI-RS resource configurations or SS/PBCH blocks that are quasi co-located, as described in, with the DM-RS of PDCCH receptions monitored by the UE. The UE applies the $Q_{in,LR}$ threshold to the L1-RSRP measurement obtained from a SS/PBCH block. The UE applies the $Q_{in,LR}$ threshold to the L1-RSRP measurement obtained for a CSI-RS resource after scaling a respective CSI-RS reception power with a value provided by higher layer parameter powerControlOffsetSS.

According to Section 5, the physical layer in the UE provides an indication to higher layers when the radio link quality for all corresponding resource configurations in the set go that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity of periodic CSI-RS configurations or SS/PBCH blocks in the set $\bar{q}_0$ that the UE uses to assess the radio link quality and 2 msec.

According to Section 5, upon request from higher layers, the UE provides to higher layers the periodic CSI-RS configuration indexes and/or SS/PBCH block indexes from the set q and the corresponding L1-RSRP measurements that are larger than or equal to the corresponding thresholds.

According to Section 5, a UE may be provided with a control resource set through a link to a search space set provided by higher layer parameter recoverySearchSpaceId, as described in Subclause 10.1, for monitoring PDCCH in the control resource set. If the UE is provided higher layer parameter recoverySearchSpaceId, the UE does not expect to be provided another search space set for monitoring PDCCH in the control resource set associated with the search space set provided by recoverySearchSpaceId.

According to Section 5, the UE may receive by higher layer parameter PRACH-ResourceDedicatedBFR, a configuration for PRACH transmission as described in Subclause 8.1. For PRACH transmission in slot n and according to antenna port quasi co-location parameters associated with periodic CSI-RS configuration or SS/PBCH block with index $q_{new}$ provided by higher layers, the UE monitors PDCCH in a search space provided by higher layer parameter recoverySearchSpaceId for detection of a DCI format with CRC scrambled by C-RNTI starting from slot n+4 within a window configured by higher layer parameter BeamFailureRecoveryConfig. For the PDCCH monitoring and for the corresponding PDSCH reception, the UE assumes the same antenna port quasi-collocation parameters with index $q_{new}$ until the UE receives by higher layers an activation for a TCI state or any of the parameters TCI-StatesPDCCH-ToAddlist and/or TCI-StatesPDCCH-ToReleaseList. After the UE detects a DCI format with CRC scrambled by C-RNTI in the search space provided by recoverySearchSpaceId, the UE monitors PDCCH candidates in the search space provided by recoverySearchSpaceId until the UE receives a MAC CE activation command for a TCI state or higher layer parameters TCI-StatesPDCCH-ToAddlist and/or TCI-StatesPDCCH-ToReleaseList.

According to Section 5, if the UE is not provided a control resource set for a search space set provided recoverySearchSpaceId or if the UE is not provided recoverySearchSpaceId, the UE does not expect to receive a PDCCH order triggering a PRACH transmission.

FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks), but may also comprise any mobile or non-mobile computing device, or any computing device including a wireless communications interface. These UEs could include NR UEs. The UEs 201 and 202 may be configured to connect, e.g., communicatively couple, with a radio access network (RAN) 210. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221. The CN 220 includes network elements. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, VNF, NFVI, and/or the like.

In this embodiment, the CN 220 comprises, as network elements, the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. The PCRF 226 may be communicatively coupled to the application server 230 via the P-GW 223. The application server 230 may signal the PCRF 226 to indicate a new service flow and select the appropriate Quality of Service (QoS) and charging parameters.

Figure 3:
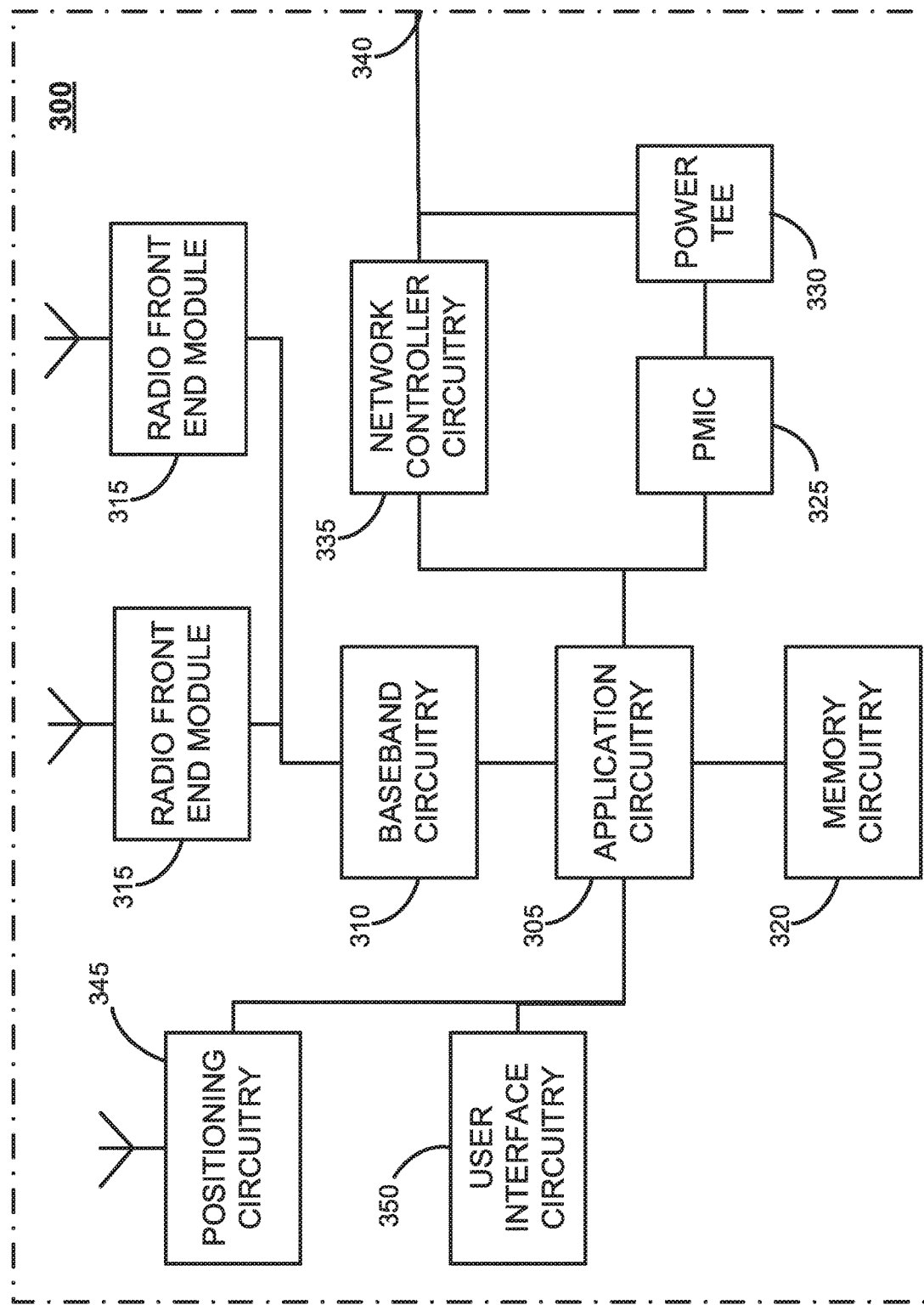
FIG. 3 illustrates example interfaces of a baseband circuitry according to some embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 211 and/or AP 206 shown and described previously. In other examples, the system 300 could be implemented in or by a UE, application server(s) 230, and/or any other element/device discussed herein. The system 300 may include one or more of application circuitry 305, baseband circuitry 310, one or more radio front end modules 315, memory circuitry 320, power management integrated circuitry (PMIC) 345, power tee circuitry 330, network controller circuitry 335, network interface connector 320, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 220 (may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, RAN device, gateway, server, virtualized VNF, NFVI, and/or the like.

Application circuitry 305 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like.

User interface circuitry 350 may include one or more user interfaces designed to enable user interaction with the system 300 or peripheral component interfaces designed to enable peripheral component interaction with the system 300. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®.

The PMIC 325 may include voltage regulators, surge protectors, power alarm detection circuitry, and one or more backup power sources such as a battery or capacitor.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless.

The positioning circuitry 345 may include circuitry to receive and decode signals transmitted by one or more navigation satellite constellations of a global navigation satellite system (GNSS).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

For one or more embodiments, the electronic device(s), network(s), system(s), chip(s) or component(s), or portions or implementations thereof, of one or more of the preceding figures, or some other figure herein may be configured to perform one or more processes, techniques, or methods as described herein, or portions thereof.

The examples set forth herein are illustrative and not exhaustive.

Example 1 includes a device of a New Radio (NR) User Equipment (UE), the device including a Radio Frequency (RF) interface, and processing circuitry coupled to the RF interface, the processing circuitry to: decode a signal from a NR evolved node B (gNodeB) including an indication of one or more control resource sets (CORESETs); select a CORESET based on the indication; and determine a downlink radio link quality based on the CORESET.

Example 2 includes the subject matter of Example 1, and optionally, wherein the signal includes a reference signal (RS) in one or more radio link monitoring (RLM) reference signal (RLM-RS) resources, wherein the one or more RLM-RS resources include at least one of all synchronization signal block (SSB) resources, all channel state information (CSI) reference signal (CSI-RS) resources, or a mixture of SSB and CSI-RS resources, and wherein the processing circuitry is to determine the downlink radio link quality based on the RS.

Example 3 includes the subject matter of Example 2, and optionally, wherein the processing circuitry is to determine the downlink radio link quality for each RLM-RS resource of the one or more RLM-RS resources by estimating the downlink radio link quality and comparing it to thresholds $Q_{out}$ and $Q_{in}$, wherein $Q_{out}$ corresponds to an out-of-sync block error rate ($BLER_{out}$) and $Q_{in}$ corresponds to an in-sync block error rate ($BLER_{in}$).

Example 4 includes the subject matter of Example 3, and optionally, wherein the processing circuitry is to determine $BLER_{out}$ and $BLER_{in}$ based on a network configuration via a higher layer parameter, or based on a configuration number.

Example 5 includes the subject matter of Example 3, and optionally, wherein the one or more RLM-RS resources include synchronization signal block (SSB) resources, and the processing circuitry is to: determine whether the downlink radio link quality estimated over a last $T_{Evaluate\_out\_SSB}$ [ms] period becomes worse than a threshold $Q_{out\_SSB}$ within a $T_{Evaluate\_out\_SSB}$ [ms] evaluation period; and determine whether the downlink radio link quality estimated over a last $T_{Evaluate\_in\_SSB}$ [ms] period becomes better than a threshold $Q_{in\_SSB}$ within a $T_{Evaluate\_in\_SSB}$ [ms] evaluation period, wherein $T_{Evaluate\_out\_SSB}$ and $T_{Evaluate\_in\_SSB}$ are based on whether a carrier frequency range for the one or more RLM-RS resources corresponds to a NR FR1 carrier frequency range or a NR FR2 carrier frequency range.

Example 6 includes the subject matter of Example 3, and optionally, herein the one or more RLM-RS resources include CSI-RS resources, and the processing circuitry is to: determine whether the downlink radio link quality estimated over a last $T_{Evaluate\_out\_CSI-RS}$ [ms] period becomes worse than a threshold $Q_{out\_CSI-RS}$ within a $T_{Evaluate\_out\_CSI-RS}$ [ms] evaluation period; and determine whether the downlink radio link quality estimated over a last $T_{Evaluate\_in\_CSI-RS}$ [ms] period becomes better than a threshold $Q_{in\_CSI-RS}$ within a $T_{Evaluate\_in\_CSI-RS}$ [ms] evaluation period, wherein $T_{Evaluate\_out\_CSI-RA}$ and $T_{Evaluate\_in\_CSI-RS}$ are based on whether a carrier frequency range for the one or more RLM-RS resources corresponds to a NR FR1 carrier frequency range or a NR FR2 carrier frequency range.

Example 7 includes the subject matter of Example 3, and optionally, wherein an evaluation period for estimation of the downlink radio link quality is based on whether a carrier frequency range for the one or more RLM-RS resources corresponds to a NR FR1 carrier frequency range or a NR FR2 carrier frequency range.

Example 8 includes the subject matter of Example 7, and optionally, wherein the evaluation period is further based on whether a reception configuration includes a discontinuous reception mode (DRX mode).

Example 9 includes the subject matter of Example 8, and optionally, wherein the evaluation period is further based on at least one a sub-frame configuration cycle $T_{CSI-RS}$, or a discontinuous reception cycle $T_{DRX}$.

Example 10 includes the subject matter of Example 2, and optionally, wherein the processing circuitry is to cause the UE to monitor up to $X_{RLM-RS}$ RLM-RS resources in each corresponding carrier frequency range, wherein $X_{RLM-RS}$ is 2 for NR FR1 carrier frequency ranges less than or equal to 3 GHz, 4 for NR FR1 carrier frequency ranges above 3 GHz, and 8 for NR FR2 carrier frequency ranges.

Example 11 includes the subject matter of Example 1, and optionally, wherein the one or more CORESETs include a plurality of candidate CORESETs, and wherein the processing circuitry is to randomly choose the CORESET from the plurality of candidate CORESETs.

Example 12 includes the subject matter of Example 3, and optionally, wherein the processing circuitry is to determine a hypothetical physical downlink control channel (PDCCH) block error rate (BLER) based on the CORESET, and to trigger an out-of-sync (OOS) indication in response to a determination that the BLER is higher than a OOS threshold.

Example 13 includes the subject matter of Example 12, and optionally, wherein the processing circuitry is to determine respective hypothetical PDCCH BLERs for respective ones of a plurality of candidate CORESETs, and to trigger an out-of-sync (OOS) indication in response to a determination that all of the respective PDCCH BLERs are higher than a OOS threshold.

Example 14 includes the subject matter of Example 13, and optionally, wherein the processing circuitry has a Layer 1 circuitry, and wherein the Layer 1 circuitry to send the OOS indication to a Layer 3 circuitry of the UE for filtering.

Example 15 includes the subject matter of Example 14, and optionally, wherein the processing circuitry is to trigger an in-sync indication in response to a determination that the BLER is lower than a OOS threshold, and the Layer 1 circuitry to send the in-sync indication to the Layer 3 circuitry of the UE for filtering.

Example 16 includes the Example of any one of Examples 1-15, further including a front end module.

Example 17 includes the subject matter of Example 16, and optionally, further including one or more antennas coupled to the front end module.

Example 18 includes a method to be performed at a device of a New Radio (NR) User Equipment (UE), the method including: decoding a signal from a NR evolved node B (gNodeB) including an indication of one or more control resource sets (CORESETs); selecting a CORESET based on the indication; and determining a downlink radio link quality based on the CORESET.

Example 19 includes the subject matter of Example 18, and optionally, wherein the signal includes a reference signal (RS) in one or more radio link monitoring (RLM) reference signal (RLM-RS) resources, wherein the one or more RLM-RS resources include at least one of all synchronization signal block (SSB) resources, all channel state information (CSI) reference signal (CSI-RS) resources, or a mixture of SSB and CSI-RS resources, and wherein the method further includes determining the downlink radio link quality based on the RS.

Example 20 includes the subject matter of Example 19, and optionally, wherein the method further includes determining the downlink radio link quality for each RLM-RS resource of the one or more RLM-RS resources by estimating the downlink radio link quality and comparing it to thresholds $Q_{out}$ and $Q_{in}$, wherein $Q_{out}$ corresponds to an out-of-sync block error rate ($BLER_{out}$) and $Q_{in}$ corresponds to an in-sync block error rate ($BLER_{in}$).

Example 21 includes the subject matter of Example 20, and optionally, wherein the method further includes determining $BLER_{out}$ and $BLER_{in}$ based on a network configuration via a higher layer parameter, or based on a configuration number.

Example 22 includes the subject matter of Example 20, and optionally, wherein the one or more RLM-RS resources include synchronization signal block (SSB) resources, and the method further includes: determining whether the downlink radio link quality estimated over a last $T_{Evaluate\_out\_SSB}$ [ms] period becomes worse than a threshold $Q_{out\_SSB}$ within a $T_{Evaluate\_out\_SSB}$ [ms] evaluation period; and determining whether the downlink radio link quality estimated over a last $T_{Evaluate\_in\_SSB}$ [ms] period becomes better than a threshold $Q_{in\_SSB}$ within a $T_{Evaluate\_in\_SSB}$ [ms] evaluation period, wherein $T_{Evaluate\_out\_SSB}$ and $T_{Evaluate\_in\_SSB}$ are based on whether a carrier frequency range for the one or more RLM-RS resources corresponds to a NR FR1 carrier frequency range or a NR FR2 carrier frequency range.

Example 23 includes the subject matter of Example 20, and optionally, wherein the one or more RLM-RS resources include CSI-RS resources, and the method further includes: determining whether the downlink radio link quality estimated over a last $T_{Evaluate\_out\_CSI-RS}$ [ms] period becomes worse than a threshold $Q_{out\_CSI-RS}$ within a $T_{Evaluate\_out\_CSI-RS}$ [ms] evaluation period; and determining whether the downlink radio link quality estimated over a last $T_{Evaluate\_in\_CSI-RS}$ [ms] period becomes better than a threshold $Q_{in\_CSI-RS}$ within a $T_{Evaluate\_in\_CSI-RS}$ [ms] evaluation period, wherein $T_{Evaluate\_out\_CSI-RA}$ and $T_{Evaluate\_in\_CSI-RS}$ are based on whether a carrier frequency range for the one or more RLM-RS resources corresponds to a NR FR1 carrier frequency range or a NR FR2 carrier frequency range.

Example 24 includes the subject matter of Example 20, and optionally, wherein an evaluation period for estimation of the downlink radio link quality is based on whether a carrier frequency range for the one or more RLM-RS resources corresponds to a NR FR1 carrier frequency range or a NR FR2 carrier frequency range.

Example 25 includes the subject matter of Example 24, and optionally, wherein the evaluation period is further based on whether a reception configuration includes a discontinuous reception mode (DRX mode).

Example 26 includes the subject matter of Example 25, and optionally, wherein the evaluation period is further based on at least one a sub-frame configuration cycle $T_{CSI-RS}$, or a discontinuous reception cycle $T_{DRX}$.

Example 27 includes the subject matter of Example 19, and optionally, wherein the method further includes causing the UE to monitor up to $X_{RLM-RS}$ RLM-RS resources in each corresponding carrier frequency range, wherein $X_{RLM-RS}$ is 2 for NR FR1 carrier frequency ranges less than or equal to 3 GHz, 4 for NR FR1 carrier frequency ranges above 3 GHz, and 8 for NR FR2 carrier frequency ranges.

Example 28 includes the subject matter of Example 18, and optionally, wherein the one or more CORESETs include a plurality of candidate CORESETs, and wherein the method further includes randomly choosing the control resource set (CORESET) from the plurality of candidate CORESETs.

Example 29 includes the subject matter of Example 20, and optionally, wherein the method further includes determining a hypothetical physical downlink control channel (PDCCH) block error rate (BLER) based on the CORESET, and triggering an out-of-sync (OOS) indication in response to a determination that the BLER is higher than a OOS threshold.

Example 30 includes the subject matter of Example 29, and optionally, wherein the method further includes determining respective hypothetical PDCCH BLERs for respective ones of a plurality of candidate CORESETs, and triggering an out-of-sync (OOS) indication in response to a determination that all of the respective PDCCH BLERs are higher than a OOS threshold.

Example 31 includes the subject matter of Example 30, and optionally, wherein the method includes using a Layer 1 circuitry of the UE to send the OOS indication to a Layer 3 circuitry of the UE for filtering.

Example 32 includes the subject matter of Example 31, and optionally, wherein the method further includes triggering an in-sync indication in response to a determination that the BLER is lower than a OOS threshold, and using the Layer 1 circuitry to send the in-sync indication to the Layer 3 circuitry of the UE for filtering.

Example 33 includes a device of a New Radio (NR) User Equipment (UE), the device including: means for decoding a signal from a NR evolved node B (gNodeB) including an indication of one or more control resource sets (CORESETs); means for selecting a CORESET based on the indication; and means for determining a downlink radio link quality based on the CORESET.

Example 34 includes the subject matter of Example 33, and optionally, wherein the signal includes a reference signal (RS) in one or more radio link monitoring (RLM) reference signal (RLM-RS) resources, wherein the one or more RLM-RS resources include at least one of all synchronization signal block (SSB) resources, all channel state information (CSI) reference signal (CSI-RS) resources, or a mixture of SSB and CSI-RS resources, and wherein the device further includes means for determining the downlink radio link quality based on the RS.

Example 35 includes the subject matter of Example 34, and optionally, wherein the device further includes means for determining the downlink radio link quality for each RLM-RS resource of the one or more RLM-RS resources by estimating the downlink radio link quality and comparing it to thresholds $Q_{out}$ and $Q_{in}$, wherein $Q_{out}$ corresponds to an out-of-sync block error rate ($BLER_{out}$) and $Q_{in}$ corresponds to an in-sync block error rate ($BLER_{in}$).

Example 36 includes the subject matter of Example 35, and optionally, wherein the device further includes means for determining $BLER_{out}$ and $BLER_{in}$ based on a network configuration via a higher layer parameter, or based on a configuration number.

Example 37 includes the subject matter of Example 35, and optionally, wherein the one or more RLM-RS resources include synchronization signal block (SSB) resources, and the device further includes: means for determining whether the downlink radio link quality estimated over a last $T_{Evaluate\_out\_SSB}$ [ms] period becomes worse than a threshold $Q_{out\_SSB}$ within a $T_{Evaluate\_out\_SSB}$ [ms] evaluation period; and means for determining whether the downlink radio link quality estimated over a last $T_{Evaluate\_in\_SSB}$ [ms] period becomes better than a threshold $Q_{in\_SSB}$ within a $T_{Evaluate\_in\_SSB}$ [ms] evaluation period, wherein $T_{Evaluate\_out\_SSB}$ and $T_{Evaluate\_in\_SSB}$ are based on whether a carrier frequency range for the one or more RLM-RS resources corresponds to a NR FR1 carrier frequency range or a NR FR2 carrier frequency range.

Example 38 includes the subject matter of Example 35, and optionally, wherein the one or more RLM-RS resources include CSI-RS resources, and the device further includes: means for determining whether the downlink radio link quality estimated over a last $T_{Evaluate\_out\_CSI-RS}$ [ns] period becomes worse than a threshold $Q_{out\_CSI-RS}$ within a $T_{Evaluate\_out\_CSI-RS}$ [ms] evaluation period; and means for determining whether the downlink radio link quality estimated over a last $T_{Evaluate\_in\_CSI-RS}$ [ms] period becomes better than a threshold $Q_{in\_CSI\_RS}$ within a $T_{Evaluate\_in\_CSI-RS}$ [ms] evaluation period, wherein $T_{Evaluate\_out\_CSI-RA}$ and $T_{Evaluate\_in\_CSI-RS}$ are based on whether a carrier frequency range for the one or more RLM-RS resources corresponds to a NR FR1 carrier frequency range or a NR FR2 carrier frequency range.

Example 39 includes the subject matter of Example 35, and optionally, wherein an evaluation period for estimation of the downlink radio link quality is based on whether a carrier frequency range for the one or more RLM-RS resources corresponds to a NR FR1 carrier frequency range or a NR FR2 carrier frequency range.

Example 40 includes the subject matter of Example 39, and optionally, wherein the evaluation period is further based on whether a reception configuration includes a discontinuous reception mode (DRX mode).

Example 41 includes the subject matter of Example 40, and optionally, wherein the evaluation period is further based on at least one a sub-frame configuration cycle $T_{CSI-RS}$, or a discontinuous reception cycle $T_{DRX}$.

Example 42 includes the subject matter of Example 34, and optionally, wherein the device further includes means for causing the UE to monitor up to $X_{RLM-RS}$ RLM-RS resources in each corresponding carrier frequency range, wherein $X_{RLM-RS}$ is 2 for NR FR1 carrier frequency ranges less than or equal to 3 GHz, 4 for NR FR1 carrier frequency ranges above 3 GHz, and 8 for NR FR2 carrier frequency ranges.

Example 43 includes the subject matter of Example 33, and optionally, wherein the one or more CORESETs include a plurality of candidate CORESETs, and wherein the device further includes means for randomly choosing a control resource set (CORESET) from the plurality of candidate CORESETs.

Example 44 includes the subject matter of Example 35, and optionally, wherein the device further includes means for determining a hypothetical physical downlink control channel (PDCCH) block error rate (BLER) based on the CORESET, and means for triggering an out-of-sync (OOS) indication in response to a determination that the BLER is higher than a OOS threshold.

Example 45 includes the subject matter of Example 34, and optionally, wherein the device further includes means for determining respective hypothetical PDCCH BLERs for respective ones of a plurality of candidate CORESETs, and means for triggering an out-of-sync (OOS) indication in response to a determination that all of the respective PDCCH BLERs are higher than a OOS threshold.

Example 46 includes the subject matter of Example 45, and optionally, wherein the device includes means for sending the OOS indication to a Layer 3 circuitry of the UE for filtering.

Example 47 includes the subject matter of Example 46, and optionally, wherein the device further includes means for triggering an in-sync indication in response to a determination that the BLER is lower than a OOS threshold, and means for sending the in-sync indication to the Layer 3 circuitry of the UE for filtering.

Example 48 includes a device of a New Radio (NR) gNodeB, the device including a Radio Frequency (RF) interface, and processing circuitry coupled to the RF interface, the processing circuitry to: encode a signal to a User Equipment (UE) including an indication of one or more control resource sets (CORESETs) to allow the UE to select a CORESET based on the one or more CORESETs; and process the signal for transmission to the UE by way of the RF interface.

Example 49 includes the subject matter of Example 48, and optionally, wherein the signal includes a reference signal (RS) in one or more radio link monitoring (RLM) reference signal (RLM-RS) resources, wherein the one or more RLM-RS resources include at least one of all synchronization signal block (SSB) resources, all channel state information (CSI) reference signal (CSI-RS) resources, or a mixture of SSB and CSI-RS resources.

Example 50 includes the subject matter of Example 48, and optionally, the processing circuitry further to decode at least one of an out-of-sync (OOS) indication from the UE or an in-sync indication from the UE.

Example 51 includes the subject matter of any one of Examples 48-50, further including a front end module.

Example 52 includes the subject matter of Example 16, and optionally, further including one or more antennas coupled to the front end module.

Example 53 includes a method to be performed at a New Radio (NR) evolved Node B (gNodeB) the method including: encoding a signal to a User Equipment (UE) including an indication of one or more control resource sets (CORESETs) to allow the UE to select a CORESET based on the one or more CORESETs; and processing the signal for transmission to the UE.

Example 54 includes the subject matter of Example 53, and optionally, wherein the signal includes a reference signal (RS) in one or more radio link monitoring (RLM) reference signal (RLM-RS) resources, wherein the one or more RLM-RS resources include at least one of all synchronization signal block (SSB) resources, all channel state information (CSI) reference signal (CSI-RS) resources, or a mixture of SSB and CSI-RS resources.

Example 55 includes the subject matter of Example 53, and optionally, further including decoding at least one of an out-of-sync (OOS) indication from the UE or an in-sync indication from the UE.

Example 56 includes a machine-readable medium including code which, when executed, is to cause a machine to perform the method of any one of Examples 18-32 and 53-55.

Example 57 includes a device including means to perform the method of any one of Examples 18-32 and 53-55.

Example 58 may include a signal as described in or related to any of the Examples above, or portions or parts thereof.

Example 59 may include a signal in a wireless network as shown and described herein.

Example 60 may include a method according to any of any one of the Examples 18-32 and 53-55 above, wherein the method or any portion thereof is implemented in or by a UE or a gNodeB.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus including memory, and processing circuitry coupled to the memory, the processing circuitry configured to:
   receive configuration of two or more control resource sets (CORESETs), wherein a same configured channel state information reference signal (CSI-RS) or synchronization signal block (SSB) is quasi-co-located (QCLed) with each of the two or more configured CORESETs;
   decode a signal from a base station that identifies one of the configured CORESETs to be used for radio link monitoring (RLM);
   select the identified one configured CORESET; and
   determine a hypothetical physical downlink control channel (PDCCH) block error rate (BLER) based on the configured CSI-RS or SSB and the configured CORESET identified by the signal from the base station; and
   trigger an out-of-sync (OOS) indication in response to a determination that the BLER is higher than a OOS threshold.

2. The apparatus of claim 1, wherein the processing circuitry is further configured to:
   determine whether downlink radio link quality estimated over a last $T_{Evaluate\_out\_SSB}$ period becomes worse than a threshold $Q_{out\_SSB}$ within a $T_{Evaluate\_out\_SSB}$ evaluation period; and
   determine whether the downlink radio link quality estimated over a last $T_{Evaluate\_in\_SSB}$ period becomes better than a threshold $Q_{in\_SSB}$ within a $T_{Evaluate\_in\_SSB}$ evaluation period, wherein $T_{Evaluate\_out\_SSB}$ and $T_{Evaluate\_in\_SSB}$ are based on whether a carrier frequency range for the configured SSB corresponds to a FR1 carrier frequency range or a FR2 carrier frequency range.

3. The apparatus of claim 1 wherein the processing circuitry is further configured to:
   determine whether downlink radio link quality estimated over a last $T_{Evaluate\_out\_CSI-RS}$ period becomes worse than a threshold $Q_{out\_CSI-RS}$ within a $T_{Evaluate\_out\_CSI-RS}$ evaluation period; and
   determine whether the downlink radio link quality estimated over a last $T_{Evaluate\_in\_CSI-RS}$ period becomes better than a threshold $Q_{in\_CSI-RS}$ within a $T_{Evaluate\_in\_CSI-RS}$ evaluation period, wherein $T_{Evaluate\_out\_CSI-RS}$ and $T_{Evaluate\_in\_CSI-RS}$ are based on whether a carrier frequency range for the configured CSI-RS corresponds to a FR1 carrier frequency range or a FR2 carrier frequency range.

4. The apparatus of claim 1, wherein an evaluation period for estimation of downlink radio link quality is based on whether a carrier frequency range for the configured CSI-RS or SSB corresponds to a FR1 carrier frequency range or a FR2 carrier frequency range.

5. The apparatus of claim 4, wherein the evaluation period is further based on whether a reception configuration includes a discontinuous reception mode (DRX mode).

6. A method to be performed at a User Equipment (UE), the method including:
receive configuration of two or more control resource sets (CORESETs), wherein a same configured channel state information reference signal (CSI-RS) or synchronization signal block (SSB) is quasi-co-located (QCLed) with each of the two or more configured CORESETs;
decoding a signal from a base station that identifies one of the configured CORESETs to be used for radio link monitoring (RLM);
selecting the identified one configured CORESET; and
determining a hypothetical physical downlink control channel (PDCCH) block error rate (BLER) based on the configured CSI-RS or SSB and the configured CORESET identified by the signal from the base station; and
triggering an out-of-sync (OOS) indication in response to a determination that the BLER is higher than a OOS threshold.

7. The method of claim 6, wherein the method further includes determining downlink radio link quality for the configured CSI-RS or SSB by estimating the downlink radio link quality and comparing it to thresholds $Q_{out}$ and $Q_{in}$, wherein $Q_{out}$ corresponds to an out-of-sync block error rate ($BLER_{out}$) and-$Q_{in}$ corresponds to an in-sync block error rate (BLERm).

8. The method of claim 7, wherein an evaluation period for estimation of downlink radio link quality is based on whether a carrier frequency range for the configured CSI-RS or SSB corresponds to a FR1 carrier frequency range or a FR2 carrier frequency range, and on whether a reception configuration includes a discontinuous reception mode (DRX mode).

9. The method of claim 8, wherein the evaluation period is further based on at least one a sub-frame configuration cycle TCSI-RS, or a discontinuous reception cycle TDRX.

* * * * *